March 24, 1942.                J. YOUHOUSE                2,277,264
ELECTRIC MOTOR
Filed Sept. 28, 1940
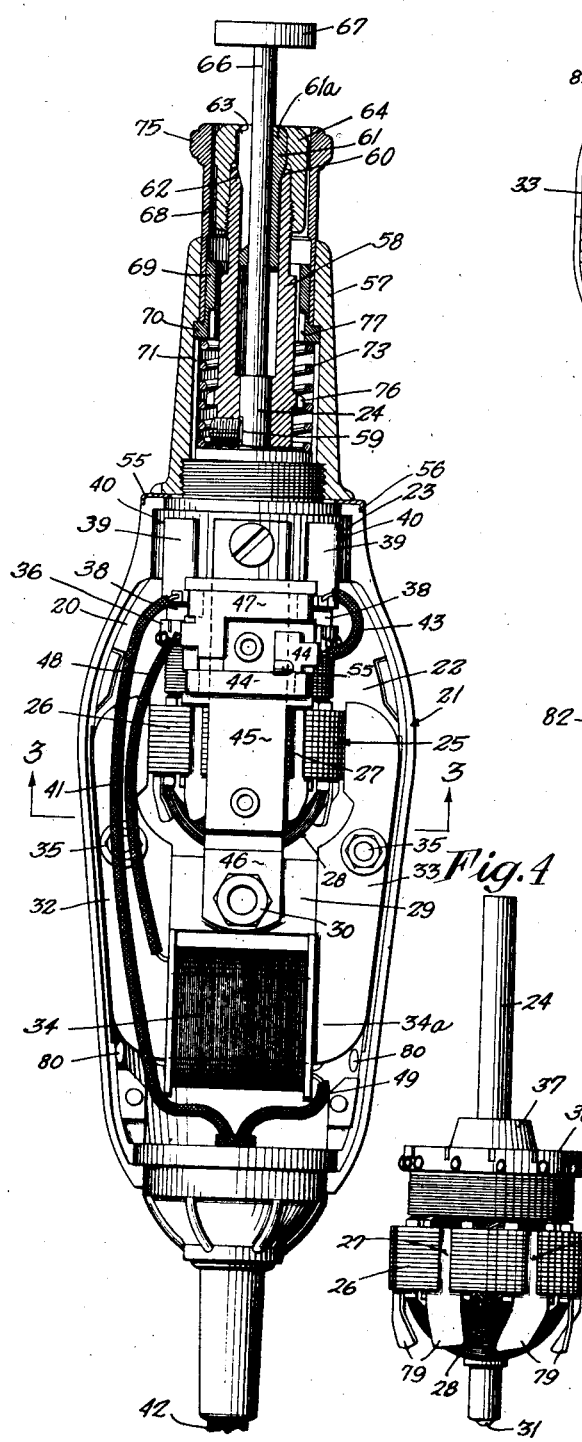
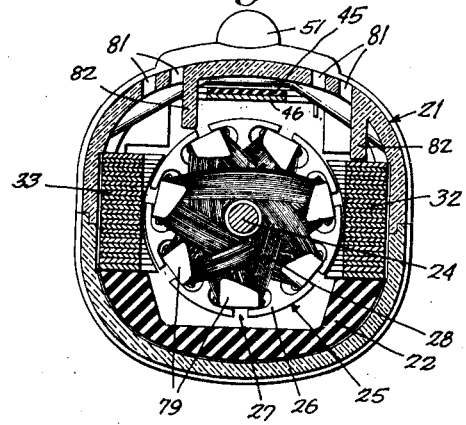
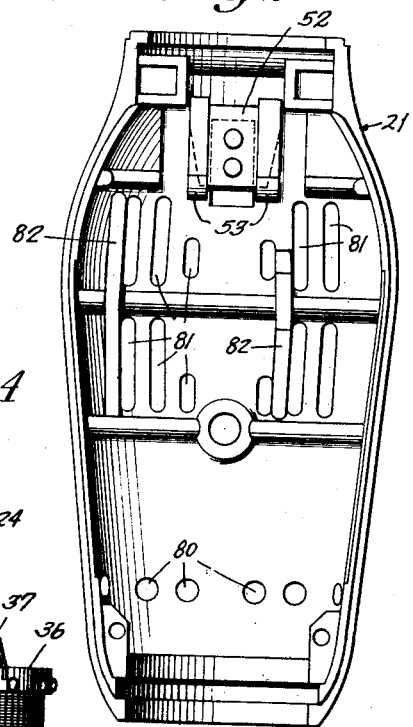
INVENTOR
Joseph Youhouse
BY Johnson, Kline & Smyth
ATTORNEYS Patented Mar. 24, 1942

2,277,264

UNITED STATES PATENT OFFICE 2,277,264

ELECTRIC MOTOR

Joseph Youhouse, Fairfield, Conn., assignor to Casco Products Corporation, Bridgeport, Conn., a corporation of Connecticut Application September 28, 1940, Serial No. 358,875

18 Claims. (Cl. 172—36)

This invention relates to electric motors, and, more particularly, to a motor, such as disclosed and claimed in my copending application Serial No. 222,123, provided with means for creating air drafts for cooling the surfaces of the motor which become heated in operation.

The motor of the present invention is particularly adapted for small portable tools in which the motor casing forms a handle by means of which the tool may be grasped and manipulated during use.

It has been previously proposed to secure small blades to the armature shafts of electric motors for creating a circulation of air within the motor casing to cool the motor, but these previously proposed devices have been objectionable in that the addition of the blade increased the size of the motor and the casing. The addition of these blades increased the overall dimension of the casing as it was necessary to add to the casing a chamber within which the blades revolved.

In the present invention the blades are carried by the core of the armature and are so shaped as to conform to the windings of the armature coil so that neither the motor nor its casing need be enlarged to accommodate the blades.

The blades, as they are frictionally anchored in the slots of the armature core, also serve to hold the turns of the coil in the slots against displacement by centrifugal force.

The blades are formed of thin metal stock having good heat-conducting qualities and so not only create cooling air drafts but also tend to conduct away and dissipate heat generated in the core of the armature.

The air set in motion by the blades enters the casing through a number of inlet ports formed in the latter at the one end thereof and is moved by the blades past the motor and thence out of the casing through discharge ports formed at the opposite end of the casing.

To prevent a turbulence of air within the casing which might impair the efficiency of the drafts, the casing carries a plurality of vanes for directing the air to the discharge ports.

The vanes prevent the air from becoming turbulent within the casing and as they are preferably made an integral part of the casing strengthen and reinforce the casing.

Other features and advantages will hereinafter appear.

In the accompanying drawing:

Figure 1 is a view, partly in section, of the device of the present invention showing one part of the motor casing removed.

Fig. 2 is an elevational view of the interior of the second half of the casing.

Fig. 3 is a sectional view of the device of the present invention taken along line 3—3 of Fig. 1.

Fig. 4 is an elevational view of the armature of the motor of the present invention.

The present invention has been illustrated in conjunction with a portable tool comprising a skeleton subframe 20 adapted to carry the moving parts of the tool and a casing 21 surrounding the subframe and forming a handle for the tool whereby it can be grasped and manipulated during use.

The motor herein shown, together with the subframe and casing, is disclosed and claimed in my above-identified copending application, and only such details of the motor, its subframe and the casing as is necessary to a full understanding of the present invention will be specifically recited here.

Inasmuch as the subframe carries the moving parts, it will take the strain incident to the operation thereof, and the casing can be made of "Tenite" or other suitable moldable material which can be readily molded to form an attractive handle.

The subframe comprises a base portion 22 having at one end thereof an integral collar 23. The collar is provided with an axial bore provided with a bearing (not shown) receiving the armature shaft 24 of an armature 25. The armature comprises a laminated core piece 26 provided with a plurality of slots 27 receiving the usual windings of the armature coil 28.

The opposite end of the shaft 24 is supported in a bearing (not shown) carried by a lug 29 extending transversely of the device and secured to the lower end of the base portion of the subframe 20 by a screw 30. The lug is provided with a central aperture (not shown) which, when the lug is secured to the base portion of the subframe, is in alignment with the bore in the collar and carries a bearing (also not shown) adapted to receive the end of the armature shaft.

The lug not only supports the end of the shaft for rotation, but it also carries the thrust of the shaft, for the lower end of the armature shaft, as shown in Fig. 4, is provided with a ball bearing 31 adapted to rest on a thrust plate carried by the lug 29.

In tools of the type described, it is desirable to make the motor as compact as possible, and to this end in the present invention the field structure of the motor is formed with a substantially U-shaped field piece, the legs 32 and 33 thereof extending longitudinally of the axis of the device and a field coil 34 disposed about the bow 34a of the U-shaped field piece.

The field piece is secured to the subframe by a pair of screws 35 with the legs of the same substantially parallel to the shaft of the armature. The field coil, as it is disposed at one end of the motor instead of at the sides thereof as in the usual motor construction, permits the motor to be of a much smaller diameter than usual.

In the present preferred form of the invention, a flat disk-shaped commutator 36, referring now to Fig. 4, is secured to the end of the armature shaft by a bushing 37 of insulating material. The wires of the armature coil are connected to the commutator segments in the usual manner.

A pair of brushes 38 cooperating with the flat face of the commutator are disposed in holders 39 positioned in pockets 40 in the collar 23 of the subframe so as to extend parallel to the axis of the armature shaft.

The one brush is connected by a wire 41 to one conductor of a lead-in connector 42 while the other brush is connected by a wire 43 to a contact member 44. The contact member 44 is carried by a plate 45 of suitable insulation material secured to a saddle member 46 having one end secured to the lug 29, and the other end to the collar 23. The insulating piece 45 carries a second contact 47 connected by wire 48 to the field coil. A wire 49 connects the opposite end of the field coil to the other conductor of the lead-in connector 42.

The casing 21 is made up of two parts, one part of which carries on its exterior wall a slidably mounted button 51 actuating a contact member 52 having a pair of resilient fingers 53 which, when the two halves of the casing are in place about the subframe, serves as a sliding connector for the contacts 44 and 47.

It will be seen, referring now to Figs. 1 and 2, that the fingers 53 will, in one position of the button 51, engage the contact 44 at opposite sides thereof, but if moved upward of the drawing, the one finger will engage contact member 47 while the other finger will snap over the knob 55 so that the two fingers in this position of the button will connect the contacts 44 and 47.

It will be seen that contacts 44 and 47, together with the fingers 53 of the contact 52, serve as a switch to make or break the circuit through the windings of the motor.

The two parts of the casing are held to the subframe by screws received within the lug 29, and thus the lug, in addition to serving as a mounting for the end of the armature shaft and saddle 46, also forms a connector for the two parts of the casing and reinforces the casing intermediate the ends thereof against compressional strains.

The two parts of the casing have their joining surfaces formed with interfitting parts, so that the casing, when the two parts are in position, forms a dust proof casing.

To prevent the parts of the casing from separating, a ring 55 is disposed about the outer surface thereof and preferably this ring has a flange 56 disposed over the end of the casing and is clamped in place by the truncated collar 57 forming a part of the tool mounting. The ring, it will be seen, is clamped in place by the truncated collar when the latter is threaded onto the end of the collar 23 of the subframe.

Any tool holder desired may be mounted to the collar 23 of the subframe for receiving tools to be driven by the motor. The tool holder such as shown and claimed in the copending application, Serial No. 331,098, filed by Joseph H. Cohen on April 23, 1940, may be used and this tool holder, referring now to Fig. 1, comprises a chuck having a sleeve 58 receiving the one end of the armature shaft 24 and secured thereon by means of a set screw threaded into engagement with a flattened portion 59 on the armature shaft. The bore at the opposite end of the sleeve is provided with a tapered camming surface 60. A sleeve 61 having an enlarged slotted head is disposed within the bore of the sleeve 58 and the slotted head provides a plurality of gripping jaws 61a for receiving and holding the shank of some desired tool.

The gripping jaws are provided on the outer surface with a camming surface 62 adapted to be engaged by the camming surface 60 of the sleeve 58. At the exterior end of the sleeve 61, a further tapered surface 63 is provided to engage an operating member 64 threaded onto the sleeve 58.

Movement of the operating member as it is threaded on or backed off the sleeve 58 will, due to the engagement between the camming surfaces, cause the jaws 61a to contract or expand so that the jaws may be released or be caused to grip the shank 66 of a tool 67.

When the device is used on fine work, it requires careful control of the tool and it is desirable to grip the device as close to the tool as possible so that the tool can be accurately guided over the work.

To this end, there is provided in the present invention a sleeve 68 slidably mounted in the collar 57. At its inner end the sleeve 68 carries within its bore a bushing 69 secured therein by a force fit. The bushing is provided with opposed keys 70 projecting therefrom and operating in slots 71 formed on the inner surface of the collar 57.

As shown in Fig. 1, the sleeve is urged to and held in projected position by means of a spring 73 seated on the end face of the collar 23 and disposed within the collar 57. The opposite end of the spring acts against the bushing 69 and holds the sleeve 68 in its projected position. The sleeve 68, it will be noted, is limited in its outward movement by the keys 70 engaging the outer ends of the slots 71.

As shown in Fig. 1, the protecting sleeve 68, when in the projected position, completely surrounds the chuck so as to prevent the user from injury should he grasp the rotating chuck, and, at the same time, provides a smooth surface by which the device may be gripped adjacent the tool 67 to insure accurate manipulation of the tool over the work. A bead 75 is formed at the end of the sleeve 68 to form a grippable member and also an abutment to prevent the hand from slipping from the sleeve.

When access to the chuck-operating means is necessary, the sleeve 68 is pushed back against the action of the spring 73 until the bead 75 engages the end of the collar 57. Preferably, the sleeve can be locked in retracted position by forming the slots on the inner surface of the collar 57 with offset portions, (not shown) into which the keys 70 can be rotated. The surface of the bead 75 can be roughened to aid in turning the sleeve.

This relieves the user of the necessity of holding the sleeve 68 against the action of the spring and frees both hands for operating the chuck which is now completely exposed.

In power-operated tools of the type described, in which an electric motor is used to drive the chuck, difficulties have been encountered when endeavoring to actuate the chuck-operating means to either tighten the grip on the shank of the tool or to release said grip. These difficulties result from the chuck being carried by the motor shaft connected to the rotor or armature of the motor which is free to rotate, and thus could not be readily held while the operating member was turned.

In the illustrated form of the present invention, however, means are provided for locking the chuck against rotation as by interlocking it with the motor casing when it is desired to actuate the chuck-operating means.

While this may be achieved in many ways in the form of the invention herein shown, the sleeve 58 is provided with a plurality of projecting teeth 76 and the bushing 69 carried by the sleeve 68 is provided with a plurality of recesses 77 spaced to receive the teeth 76 when the sleeve 68 is moved to the retracted position.

Thus it will be seen that the moving of the sleeve into retracted position not only renders the chuck-operating means accessible for operation, but, at the same time, locks the chuck sleeve to the casing and against rotation.

With the protecting sleeve locked in retracted position, the chuck sleeve will be rigidly locked to the casing and the user can then hold the casing in one hand and turn the operating member for the chuck in either direction to cause the chuck to grip or release the shank of the tool as desired.

In the use of tools such as disclosed by the present invention, it has been found that in some work, the motor would be overloaded which would cause the motor and its casing to become overheated impairing the efficiency of the motor, and, in some instances, rendering it difficult to use the tool due to the heat developed by the motor.

To prevent the motor of the present invention from becoming overheated, the present invention provides means for circulating air within the casing so that air drafts are continually moved over the motor while the same is in operation.

In the broader aspects of the present invention, this might be accomplished by a number of different means, but in the now preferred form of the invention as herein shown, this means comprises a plurality of blades 79 carried by the armature and rotated therewith.

The blades 79, referring now to Fig. 4, are frictionally anchored in the slots 27 of the core 26 of the armature 25 and serve to hold the turns of the armature coil 28 in position against the action of centrifugal force.

The blades 79 are shaped to conform to the windings of the armature coil 28 and are located closely adjacent to the outer surface of the coil. They do not, for that reason, increase the size of the motor so that the compactness of the device is in no way impaired.

The blades 79 are so formed that when the armature is rotated, the blades draw air through a plurality of inlet ports 80 formed in both parts of the casing 21, which inlet ports are located about the field coil 34 and the air drawn into the casing through these ports is pulled up over the field coil 34, U-shaped field pieces 32 and 33, armature 25 and then out of the casing through exhaust ports 81 formed in but one part of the casing 21.

The blades preferably are formed of thin metal stock having good heat-conducting properties. The blades, inasmuch as they are frictionally anchored in the slots of the armature core, will conduct away and dissipate heat generated in the core so that they act in one sense as fins by conducting the heat generated in the coil away from the same.

To insure that continually moving air drafts are created within the casing and that no turbulence of air within the casing is set up, the casing part formed with the exhaust ports 81 also carried a number of vanes 82 for directing the air moved by the blades 79 out through exhaust ports 81. The vanes 82 may be attached to the casing part in any way desirable, but in the preferred form of the invention, the vanes are formed integral with the casing part when the same is molded. The vanes are so positioned on the interior wall of the casing part, referring now to Fig. 2, that the air set in motion by the blades will be directed against the vanes and thence through exhaust ports.

The vanes, in addition to directing the air set in motion by the blades, also tend to act as reinforcing ribs and strengthen the casing part of which they form an integral part.

The motor of the tool, inasmuch as it is continually cooled while in operation, has its overload capacity increased so that the motor might be overloaded without impairing the efficiency of the motor.

Variations and modifications may be made within the scope of this invention and portions of the improvements may be used without others.

I claim:

1. In a device of the type described, a rotating armature comprising a slotted core wound with a plurality of turns of wire; a field; and a plurality of blades frictionally anchored in the slots of said armature for moving air over said field and armature to cool the same.

2. In a device of the type described, a rotating armature comprising a slotted core wound with a plurality of turns of wire; a field; and a plurality of blades frictionally anchored in the slots of said armature for moving air over said field and armature to cool the same, said blades holding said turns of wire in the slots against displacement by centrifugal force.

3. In a device of the type described, a rotating armature comprising a slotted core wound with a plurality of turns of wire; a field; a plurality of blades frictionally anchored in the slots of said armature for moving air over said field and armature to cool the same; and means for directing the air moved by said blades.

4. In a device of the type described, a rotating armature comprising a slotted core wound with a plurality of turns of wire; a field; a plurality of blades frictionally anchored in the slots of said armature for moving air over said field and armature to cool the same; a casing housing said armature and field; and means carried by said casing for directing the air moved by said blades.

5. In a device of the type described, a rotating armature comprising a slotted core wound with a plurality of turns of wire; a field; a plurality of blades frictionally anchored in the slots of said armature for moving air over said field and armature to cool the same; a casing housing said armature and field; and means carried by said casing for directing the air moved by said blades, said means being formed integrally with said casing and reinforcing the same.

6. In a device of the type described, a rotating armature comprising a slotted core wound with a plurality of turns of wire; a field; a plurality of blades frictionally anchored in the slots of said armature for moving air over said field and armature to cool the same; a casing housing said armature and field, said casing being formed with inlet and outlet ports; and means within said casing for directing air entering said inlet ports upon rotation of said armature through said casing to said outlet ports.

7. In a device of the type described, a rotating armature comprising a slotted core wound with a plurality of turns of wire; a field; a plurality of blades frictionally anchored in the slots of said armature for moving air over said field and armature to cool the same; a casing housing said armature and field, said casing having inlet ports formed about said field and outlet ports disposed adjacent said armature; and means within said casing for directing air entering said inlet ports over said field and armature before being discharged through said outlet ports.

8. In a portable motor driven device, a drive motor; a skeleton frame supporting the armature and field of said motor in fixed relative positions; a plurality of blades frictionally secured to said armature and substantially conforming to the shape thereof; and a casing enclosing the motor, said casing being formed with inlet and outlet ports so that air may be drawn into the casing by said blades and then discharged through said outlet ports.

9. In a portable motor driven device, a drive motor; a skeleton frame supporting the armature and field of said motor in fixed relative positions, said armature comprising a slotted core wound with a plurality of turns of wire; a plurality of blades frictionally anchored in the slots of said armature; a casing housing said motor, said casing being formed with inlet and outlet ports; and means within said casing for directing air entering said inlet ports to said outlet ports.

10. In a portable motor driven device, an elongate electric motor comprising a U-shaped field structure, a field coil disposed about the base of the field structure, and an armature extending parallel to the legs of the U and located therebetween; a plurality of blades curved to conform with the shape of said armature and carried thereby for creating air drafts upon rotation of the armature; and a casing housing said motor and forming a handle for the device, at least one side of said casing being formed with inlet ports disposed about said field coil and a plurality of outlet ports formed on the opposite side of said casing adjacent said armature, the air drafts created by said blades when rotated extending longitudinally and transversely of the motor for cooling the field structure, coil and armature.

11. In a portable motor driven device, an elongate electric motor comprising a U-shaped field structure; a field coil disposed about the base of the field structure, and an armature extending parallel to the legs of the U and located therebetween; a plurality of blades carried by said armature; a casing housing said motor, said casing being formed with inlet ports disposed about said field coil and outlet ports adjacent said armature, the blades upon rotation of said armature creating cooling air drafts within said casing extending longitudinally of said motor; and vanes formed on the interior wall of said casing adjacent said outlet ports for directing the air drafts set up by said blades to said outlet ports, the blades being curved to conform to the shape of said armature to reduce the overall size of said armature and to prevent interference with the vanes.

12. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a plurality of blades frictionally anchored in the slots of said armature and holding the turns of wire therein; and a casing housing said motor, said casing being formed with a plurality of apertures disposed about said field coil and additional apertures adjacent said armature, the blades upon rotation of said armature drawing air into the casing through said apertures disposed about said field coil and creating cooling air drafts within said casing longitudinally of the motor, and thence through said apertures formed adjacent said armature.

13. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a casing housing said motor; and heat-conducting means carried within the slots of said armature for conducting heat away from the same, said means comprising means for creating a circulation of the air longitudinally of the casing for cooling the field structure, field coil and armature.

14. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a casing housing said motor; and heat-conducting means carried within the slots of said armature for conducting heat away from the same, said means comprising means for creating air drafts within said casing longitudinally of the motor, the casing being formed with a plurality of inlet ports disposed about said field coil and outlet ports adjacent said armature, the means drawing air into the casing through said inlet ports and moving it out of the casing through said outlet ports.

15. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a casing housing said motor; heat-conducting means carried within the slots of said armature for dissipating heat generated within the same, said means upon rotation of said armature creating air drafts within said casing longitudinally of the motor, the casing being formed with a plurality of inlet ports disposed about said field coil and outlet ports adjacent said armature, the means drawing air into the casing through said inlet ports and moving it out of the casing through said outlet ports; and air current directing means carried by said casing for directing the air currents within the same to prevent a turbulence of the air within the casing.

16. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a plurality of heat conducting fins frictionally anchored in the slots of the armature and holding the turns of wire therein; and a casing housing said motor, said casing being formed with a plurality of inlet ports disposed about said field coil and outlet ports adjacent said armature, the fins upon rotation of said armature creating cooling air drafts within said casing extending longitudinally of said motor whereby heat generated within the armature is conducted away and heat generated in the field structure and field coil is conveyed away by the air drafts created by said fins.

17. In a portable motor driven device, an elongate electric motor comprising a U-shaped field structure, a field coil around the base of the U, an armature extending parallel to the legs of the U and located therebetween, said armature comprising a slotted core wound with a plurality of turns of wire; a plurality of heat-conducting fins frictionally anchored in the slots of the armature and holding the turns of wire therein; a casing housing said motor, said casing being formed with a plurality of inlet ports disposed about said field coil and outlet ports adjacent said armature, the fins upon rotation of said armature creating cooling air drafts within said casing extending longitudinally of said motor whereby heat generated within the armature is conducted away and heat generated in the field structure and field coil is conveyed away by the air drafts created by said fins; and vanes formed on the interior wall of said casing for directing the air drafts to said outlet ports, said vanes being formed integral with said casing and forming reinforcing ribs for the same.

18. In a portable motor driven device, a casing forming a handle for said device; an elongate electric motor mounted in the casing, said motor comprising a substantially spherical shaped armature; a plurality of blades carried by said armature, said casing being formed with a ring of inlet ports at one end thereof and a plurality of outlet ports at one side thereof, said outlet ports extending substantially the length of said armature; and air current directing means carried by said casing adjacent said outlet ports for directing the air currents to the said outlet ports, said air currents extending longitudinally and transversely of said motor to cool the same, the blades being curved to conform with the substantially spherical shape of said armature and lying closely adjacent to the surface of the same thereby reducing the overall size of said armature and preventing interference between the blades and the air current directing means carried by the casing.

JOSEPH YOUHOUSE.